US008126186B2

(12) United States Patent  
Kameoka

(10) Patent No.: US 8,126,186 B2  
(45) Date of Patent: Feb. 28, 2012

(54) DISPLAY

(75) Inventor: Shinichi Kameoka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 731 days.

(21) Appl. No.: 12/265,170

(22) Filed: Nov. 5, 2008

(65) Prior Publication Data

US 2009/0116679 A1 May 7, 2009

(30) Foreign Application Priority Data

Nov. 6, 2007 (JP) .................................. 2007-288228

(51) Int. Cl.  
*H04R 1/02* (2006.01)

(52) U.S. Cl. ....................................... 381/388; 381/333

(58) Field of Classification Search .................. 381/388, 381/300, 306, 333, 431  
See application file for complete search history.

(56) References Cited

U.S. PATENT DOCUMENTS

| 7,826,634 B2 * | 11/2010 | Soga | 381/345 |
| 2006/0187364 A1 * | 8/2006 | Fukano | 348/836 |
| 2006/0280328 A1 * | 12/2006 | Nakagawa | 381/388 |

FOREIGN PATENT DOCUMENTS

| GB | 749183 | 5/1956 |
| GB | 2 312 130 A | 10/1997 |
| JP | 60-43995 A | 3/1985 |
| JP | 8-98113 A | 4/1996 |
| JP | 2004-320426 A | 11/2004 |
| JP | 2007-116221 A | 5/2007 |

OTHER PUBLICATIONS

The Extended European Search Report dated Oct. 6, 2011 (Seven (7) pages).

* cited by examiner

*Primary Examiner* — Roy Potter  
(74) *Attorney, Agent, or Firm* — Crowell & Moring LLP

(57) ABSTRACT

A display includes a frame-shaped front housing for fixing a display portion so as to expose the display portion, a speaker and a speaker mounting portion for mounting to be capable of outputting a sound downward and forward in a state where the speaker is inclined by a prescribed angle with respect to a front surface of the front housing, integrally formed in the vicinity of a lower end of a back surface of the front housing.

16 Claims, 9 Drawing Sheets

DISPLAY

BACKGROUND OF THE INVENTION

1. Field of the Invention

The present invention relates to a display, and more particularly, it relates to a display comprising a housing and a speaker.

2. Description of the Background Art

A display comprising a housing and a speaker is known in general, as disclosed in Japanese Patent Laying-Open Nos. 2007-116221 and 2004-320426, for example.

The aforementioned Japanese Patent Laying-Open No. 2007-116221 discloses a thin display comprising a front cabinet (front housing) formed in a frame shape, speakers and speaker panels for concealing the speakers so as not to see the speakers from a surface when mounting the speakers on the front cabinet (front housing). In this thin display, the speakers and the speaker panels are set on both ends of the front cabinet in a horizontal direction respectively. The sounds output from the speakers are output forward from a front surface of the front cabinet.

The aforementioned Japanese Patent Laying-Open No. 2004-320426 discloses a display comprising speakers, a television mounted with the speakers and an accessory panel mounted on a front surface of a housing of the television. In this display, the speakers are set on both ends of the television in a horizontal direction respectively. Speaker nets for protecting the speakers are mounted on the both ends of the accessory panel in the horizontal direction respectively. The sounds output from the speakers are output forward from a front surface of the accessory panel.

In the thin display described in the aforementioned Japanese Patent Laying-Open No. 2007-116221, however, the speakers are set on the both ends of the front cabinet (front housing) in the horizontal direction respectively, and hence the length of the front cabinet (front housing) in the horizontal direction is disadvantageously increased.

Further, in the display described in the aforementioned Japanese Patent Laying-Open No. 2004-320426, the speakers are set on the both ends of the television in the horizontal direction, and hence the length of the housing in the horizontal direction is disadvantageously increased.

SUMMARY OF THE INVENTION

The present invention has been proposed in order to solve the aforementioned problems, and an object of the present invention is to provide a display capable of reducing a length of a housing in a horizontal direction.

A display according to an aspect of the present invention comprises a frame-shaped front housing for fixing a display portion so as to expose the display portion, a speaker and a speaker mounting portion for mounting to be capable of outputting a sound downward and forward in a state where the speaker is inclined by a prescribed angle with respect to a front surface of the front housing, integrally formed in the vicinity of a lower end of a back surface of the front housing.

As hereinabove described, the display according to the aspect comprises the speaker mounting portion in the vicinity of the lower end of the back surface of the front housing, whereby the speaker is mounted in the vicinity of the lower end of the back surface of the front housing and hence the length of the front housing in the horizontal direction can be reduced. The speaker is mounted in the state of being inclined by the prescribed angle with respect to the front surface of the front housing, whereby a sound can output downward and forward and hence a sound output from the front side can be inhibited from being difficult to be heard.

The display according to the aforementioned aspect preferably further comprises a first movement regulating portion for regulating movement of the speaker in a direction along a surface of the speaker mounting portion when mounting the speaker on the speaker mounting portion, formed integrally with the front housing. According to this structure, the speaker can be mounted while the first movement regulating portion inhibits the speaker from moving in the direction along the surface of the speaker mounting portion.

In this case, a surface in contact with an end side of the speaker of the first movement regulating portion is preferably formed substantially perpendicular to the surface of the speaker mounting portion. According to this structure, the speaker can be mounted at the prescribed position of the speaker mounting portion only by bringing the end side of the speaker into contact with the first movement regulating portion.

In the aforementioned display comprising the first movement regulating portion, the first movement regulating portion preferably includes an antislip rib extending in a direction substantially orthogonal to a longitudinal direction of the speaker mounting portion. According to this structure, the speaker can be mounted while the antislip rib inhibits the speaker from slipping in the direction substantially orthogonal to the longitudinal direction of the speaker mounting portion.

The display according to the aforementioned aspect preferably further comprises a second movement regulating portion for bringing the speaker into close contact with the speaker mounting portion while regulating movement of the speaker in a direction perpendicular to a surface of the speaker mounting portion when mounting the speaker on the speaker mounting portion, formed integrally with the front housing. According to this structure, the speaker can be mounted in the state where the second movement regulating portion inhibits the speaker from moving in the direction perpendicular to the surface of the speaker mounting portion. Thus, the speaker can come into close contact with and mounted on the speaker mounting portion and hence the sound output from the speaker can be output forward of the front housing. Consequently, sounds can be inhibited from staying in the housing.

In this case, a corner of an end side of the speaker preferably is so formed as to dent the second movement regulating portion in a state where the speaker is mounted on the speaker mounting portion. According to this structure, the speaker can be inhibited from deviating with respect to the second movement regulating portion.

In the aforementioned display comprising the second movement regulating portion, the second movement regulating portion preferably includes a fixing rib formed so as to extend in a direction substantially parallel to a longitudinal direction of the speaker mounting portion. According to this structure, the speaker can be fixed in the state where the fixing rib inhibits the speaker from moving in the direction perpendicular to the surface of the speaker mounting portion.

In the display according to the aforementioned aspect, the speaker mounting portion is preferably formed in a plate-like shape in the vicinity of the lower end of the back surface of the front housing in a state of being inclined by a prescribed angle with respect to the front surface of the front housing, and a triangular reinforcing rib is provided between the plate-like speaker mounting portion and the back surface of the front housing. According to this structure, the speaker mounting portion can be reinforced by the reinforcing rib in the state of being inclined by a prescribed angle with respect to the front surface of the front housing and hence the strength of the speaker mounting portion can be improved.

The display according to the aforementioned aspect preferably further comprises a first movement regulating portion for regulating movement of the speaker in a direction along a surface of the speaker mounting portion when mounting the speaker on the speaker mounting portion, formed integrally with the front housing, a second movement regulating portion for bringing the speaker into close contact with the speaker mounting portion while regulating movement of the speaker in a direction perpendicular to the surface of the speaker mounting portion when mounting the speaker on the speaker mounting portion, formed integrally with the front housing and a holding member for holding the speaker and mounting the speaker on the speaker mounting portion, wherein a speaker held by the holding member is so formed as to be fixed in a state where an end side of the speaker is in contact with the first movement regulating portion and the second movement regulating portion when mounting the speaker on the speaker mounting portion. According to this structure, the first movement regulating portion and the second movement regulating portion regulate the movement of the speaker with respect to the surface of the speaker mounting portion and the speaker can be firmly mounted on the speaker mounting portion by the holding member.

In this case, a plurality of the first movement regulating portions and a plurality of the second movement regulating portions are preferably provided, and are preferably alternately arranged in a direction along a longitudinal direction of the speaker mounting portion. According to this structure, the first movement regulating portion and the second movement regulating portion can further regulate the movement of the speaker with respect to the speaker mounting portion.

In this case, the holding member preferably has a speaker holding portion formed substantially parallel to the speaker mounting portion in a state of holding the speaker and a front housing mounting portion formed substantially parallel to the front housing in a state of holding the speaker. According to this structure, the speaker holding portion of the holding member is formed parallel to the speaker mounting portion mounting the speaker in the state of being inclined by the prescribed angle with respect to the front surface of the front housing, and hence the speaker can be easily mounted on the speaker mounting portion by the speaker holding portion of the holding member in the state of being inclined by the prescribed angle with respect to the front housing when mounting the holding member on the front housing.

In this case, the speaker holding portion of the holding member preferably includes an engaging portion engaging with the end side of the speaker, and the speaker is preferably mounted on the speaker mounting portion in a state of engaging with the engaging portion of the holding member. According to this structure, the speaker can be firmly fixed to the speaker mounting portion.

In the aforementioned display comprising the first movement regulating portion, the second movement regulating portion and the holding member, either one of the front housing mounting portion of the holding member or the front housing includes a first positioning boss portion, either the other of the front housing mounting portion of the holding member or the front housing includes a first positioning hole, and the holding member holding the speaker is so formed as to be positioned at a prescribed position with respect to the front housing by inserting the first positioning boss portion into the first positioning hole. According to this structure, the holding member can be easily positioned at the prescribed position with respect to the front housing by arranging the front housing mounting portion of the holding member so as to inserting the first positioning boss portion into the first positioning hole.

In the aforementioned display comprising the first movement regulating portion, the second movement regulating portion and the holding member, either one of the speaker holding portion of the holding member or the speaker preferably includes a second positioning boss portion, either the other of the speaker holding portion of the holding member or the speaker preferably includes a second positioning hole, and the speaker is preferably held by the speaker holding portion of the holding member by inserting the second positioning boss portion into the second positioning hole and the holding member is preferably so formed as to be positioned with respect to the speaker. According to this structure, the speaker holding portion of the holding member can be easily positioned at the prescribed position with respect to the speaker by arranging the speaker holding portion of the holding member so as to insert the second positioning boss portion into the second positioning hole.

In this case, the second positioning boss portion preferably has a tapered shape. According to this structure, the second positioning boss portion can be easily inserted into the second positioning hole.

In the aforementioned display comprising the second positioning boss portion, the second positioning boss portion preferably has a cruciform shape in plan view. According to this structure, the second positioning boss portion can be easily inserted into the second positioning hole.

In the display according to the aforementioned aspect, a surface of the speaker mounting portion on which the speaker is mounted preferably includes an acoustical hole for outputting a sound from the speaker. According to this structure, the sound output from the speaker can be reliably output downward and forward from the acoustical hole.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be hereinafter described with reference to the accompanying drawings.

A structure of a liquid crystal display 1 according to the embodiment of the present invention will be now described with reference to FIGS. 1 to 15. This embodiment of the present invention is applied to the liquid crystal display 1, which is an exemplary display.

Figure 1:
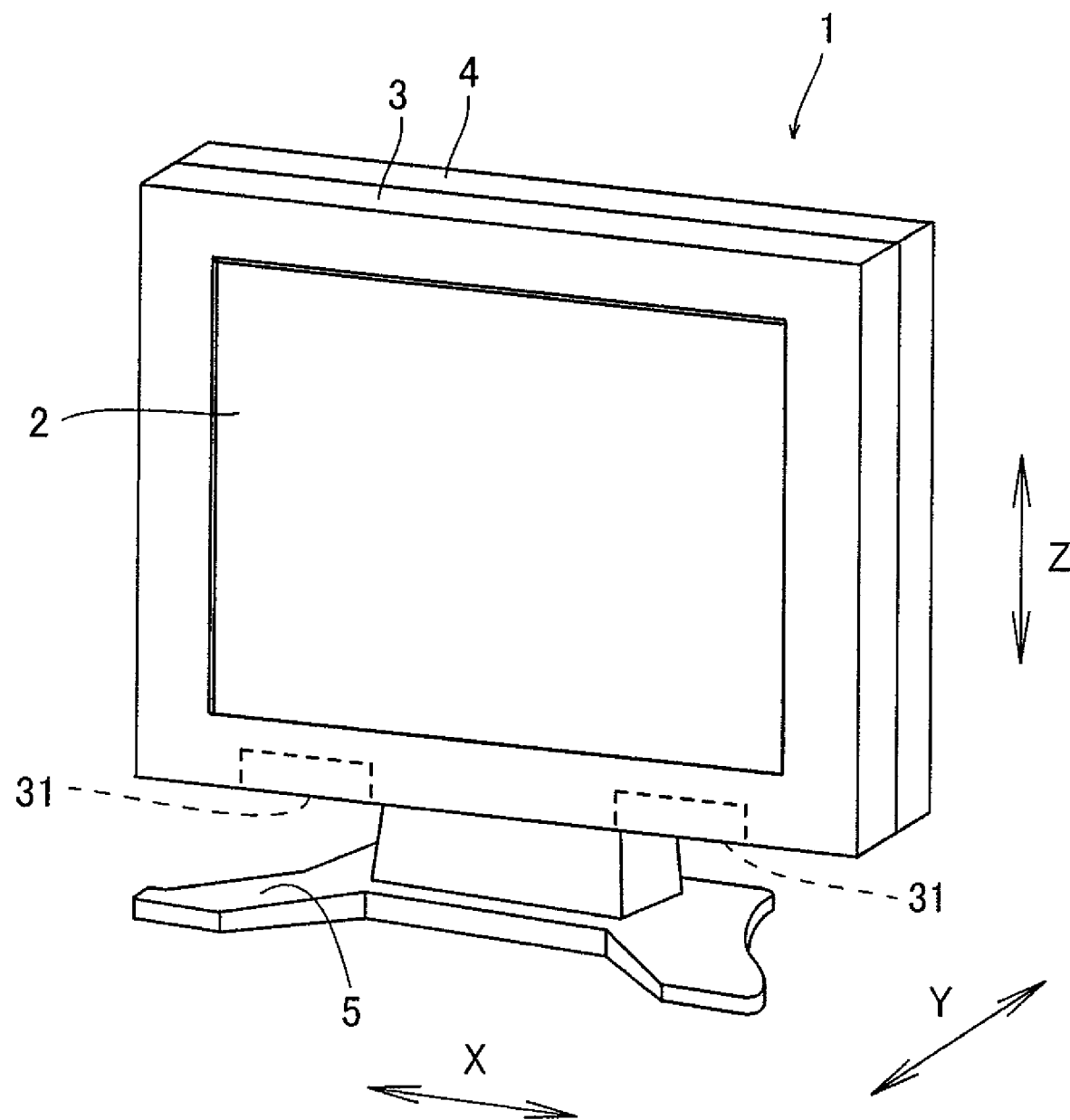
FIG. 1 is a perspective view showing an overall structure of a liquid crystal display according to an embodiment of the present invention.

The liquid crystal display 1 according to the embodiment of the present invention comprises a liquid crystal panel 2 for displaying images, as shown in FIG. 1. The liquid crystal panel 2 is made of resin and is supported by a front cabinet 3 and a rear cabinet 4 formed in square frame shapes in plan view. A stand 5 is supported by the liquid crystal panel 2, a front cabinet 3 and a rear cabinet 4. The front cabinet 3 is an example of the "front housing" in the present invention.

Figure 2:
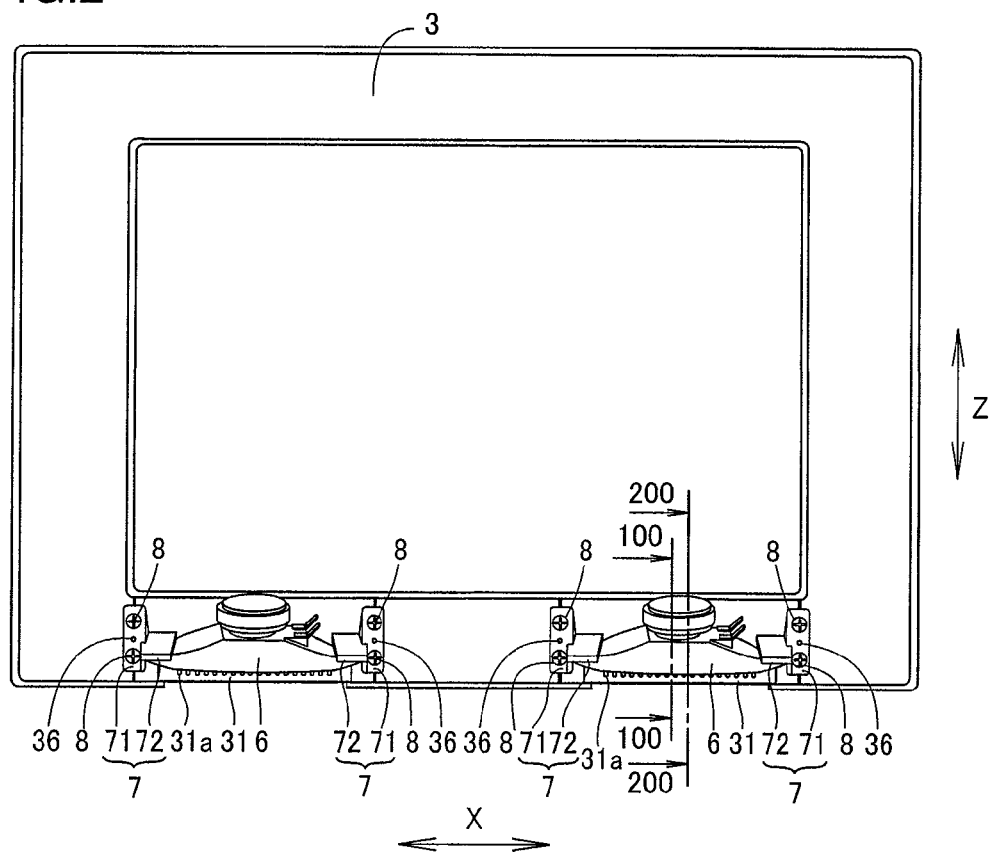
FIG. 2 is a plan view of speakers according to the embodiment of the present invention in a state mounted on speaker mounting portions.

According to this embodiment, speakers 6, holders 7 and screws 8 are mounted in the vicinity of a lower end of a back surface of the front cabinet 3 of the liquid crystal display 1, as shown in FIG. 2. The holder 7 is an example of the "holding member" in the present invention.

According to this embodiment, the front cabinet 3 is formed integrally with speaker mounting portions 31, reinforcing ribs 32, antislip ribs 33, fixing ribs 34, screw mounting boss portions 35 and positioning boss portions 36, as shown in FIGS. 2 to 10. Each of the antislip ribs 33 is an example of the "first movement regulating portion" in the present invention, each of the fixing ribs 34 is an example of the "second movement regulating portion" in the present invention, and each of the positioning boss portions 36 is an example of the "first positioning boss portion" in the present invention.

Figure 6:
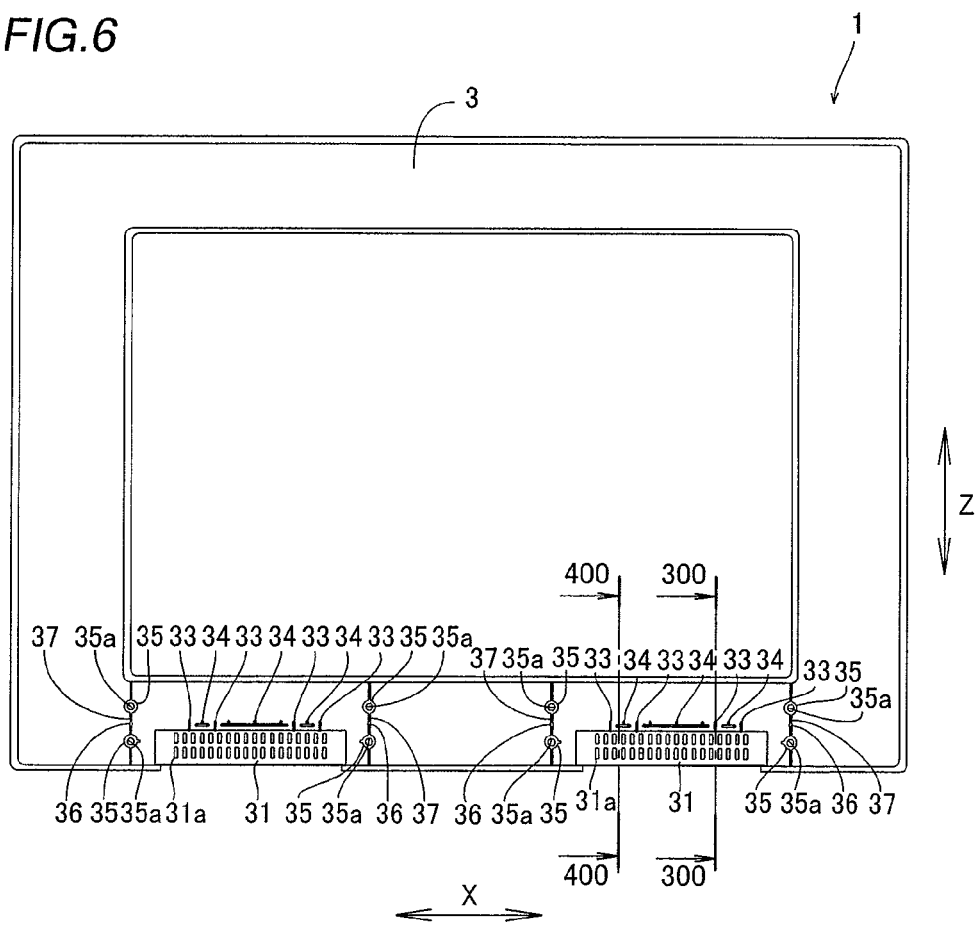
FIG. 6 is a plan view of the speaker mounting portions according to the embodiment of the present invention.
Figure 8:
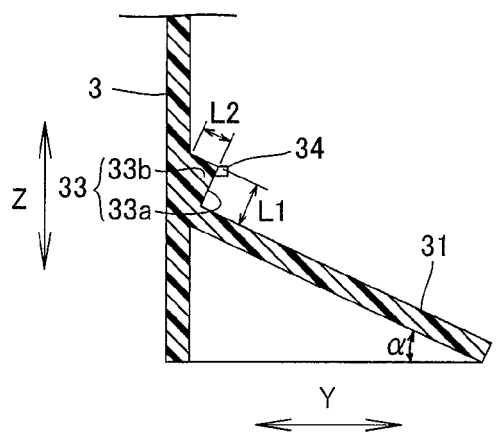
FIG. 8 is a sectional view taken along the line 300-300 in the plan view of the speaker mounting portion according to the embodiment of the present invention.
Figure 9:
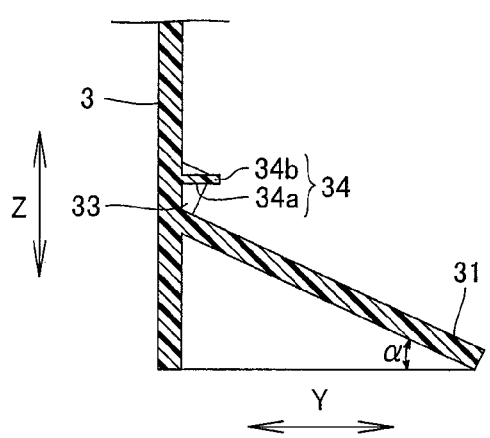
FIG. 9 is a sectional view taken along the line 400-400 in the plan view of the speaker mounting portion according to the embodiment of the present invention.
Figure 10:
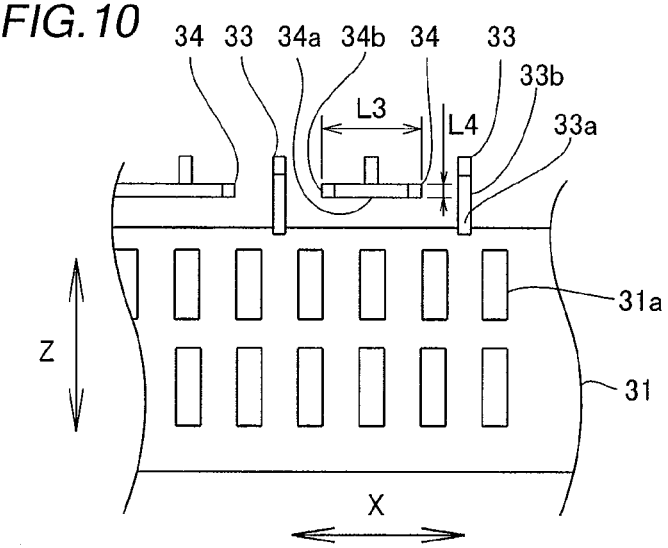
FIG. 10 is a plan view of antislip ribs and fixing ribs according to the embodiment of the present invention.

According to this embodiment, the speaker mounting portions 31 have rectangular shapes as viewed from a direction Y, as shown in FIG. 6. Further, a plurality of rectangular (slitlike) acoustical holes 31 for outputting sounds of the speakers 6 from the speaker mounting portions 31 are provided at equal intervals in a direction X. As shown in FIGS. 8 to 10, each speaker mounting portion 31 is so formed that an angle a formed by a mounting surface of the speaker mounting portion 31 and a bottom surface of the front cabinet 3 is about 25 degrees and is enabled to output a sound downward and forward.

Figure 3:
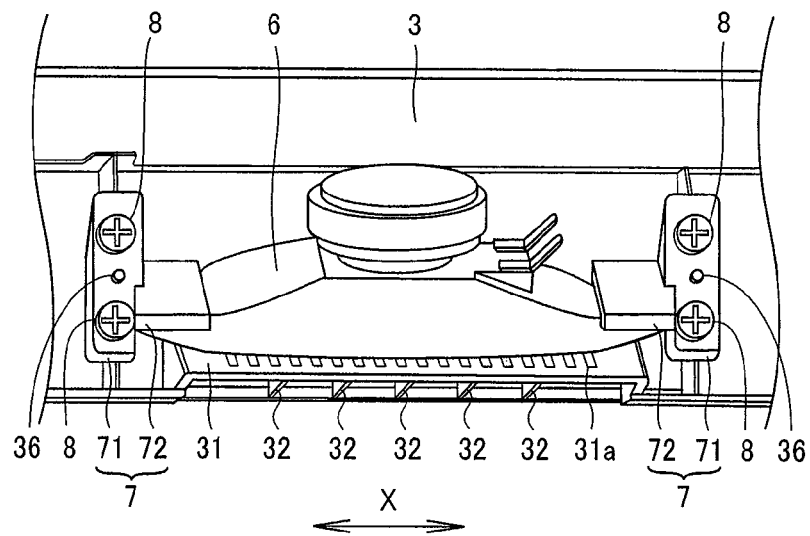
FIG. 3 is a perspective view of the speaker according to the embodiment of the present invention in the state mounted on the speaker mounting portion.
Figure 4:
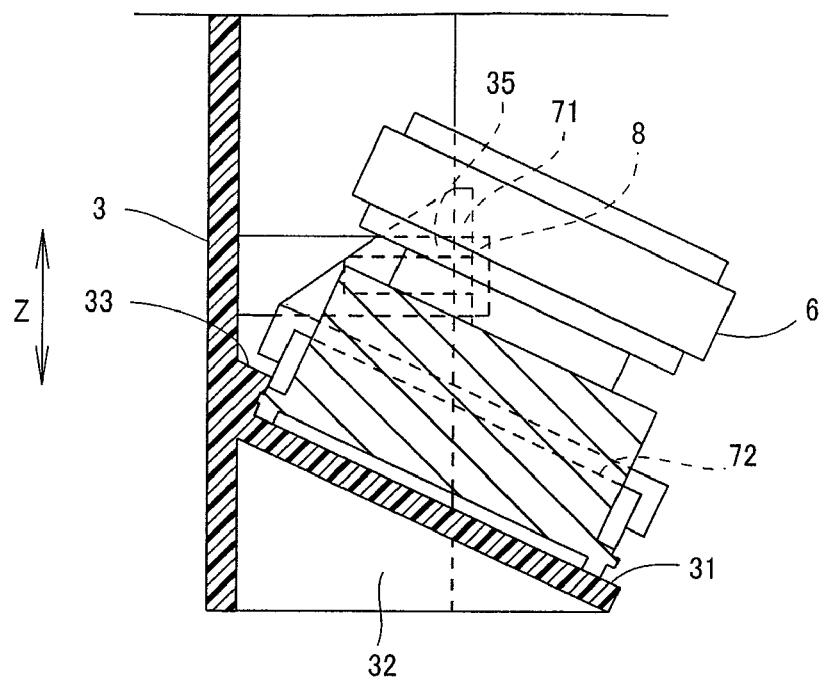
FIG. 4 is a sectional view taken along the line 100-100 in the plan view of the speaker according to the embodiment of the present invention in the state mounted on the speaker mounting portion.
Figure 5:
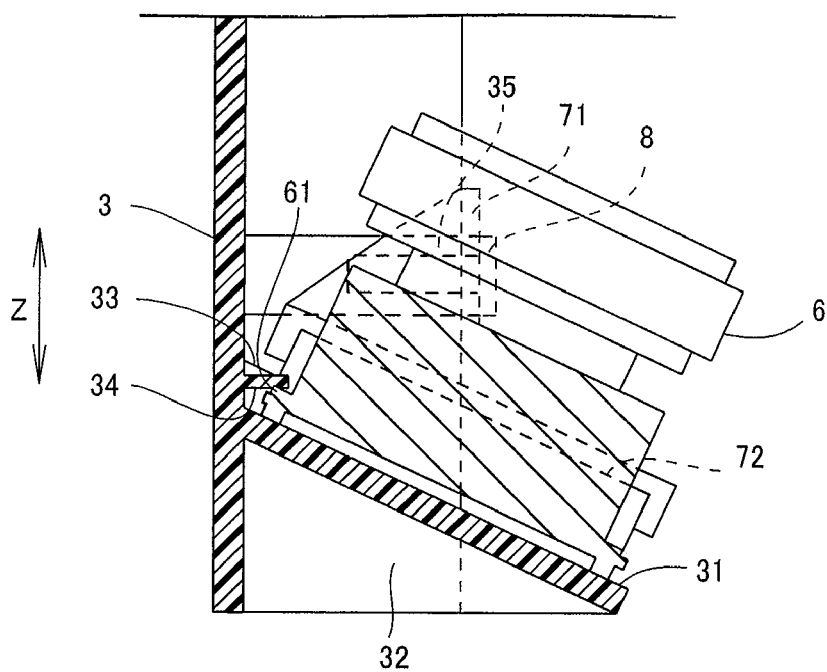
FIG. 5 is a sectional view taken along the line 200-200 in the plan view of the speaker according to the embodiment of the present invention in the state mounted on the speaker mounting portion.

As shown in FIG. 3, the reinforcing ribs 32 are provided between the front cabinet 3 and the speaker mounting portions 31. As shown in FIGS. 4 and 5, the reinforcing ribs 32 are formed in triangular shapes as viewed from a longitudinal direction (direction X) of the front cabinet 3. One side of each reinforcing rib 32 is mounted on the back surface of the front cabinet 3 while the other side is formed on a back surface of the mounting surface of each speaker mounting portion 31.

According to this embodiment, the antislip ribs 33 have I-shapes as viewed from the direction Y, as shown in FIGS. 6 and 10. As shown in FIGS. 4 and 8, one side of each antislip rib 33 is formed integrally with the back surface of the front cabinet 3 as shown in FIGS. 4 and 8. The antislip ribs 33 are so formed as to have triangular shape cross sections as viewed from the direction X. The antislip ribs 33 are so formed that the lengths L1 of surfaces 33a of the antislip ribs 33 in contact with the speakers 6 are larger than the lengths L2 of surfaces 33b not in contact with the speakers 6. The surfaces 33a of the antislip ribs 33 in contact with the speakers 6 are formed perpendicular to the surfaces of the speaker mounting portions 31. The antislip ribs 33 are so formed as to extend in a direction (direction Z) substantially orthogonal to a longitudinal direction (direction X) of the speaker mounting portions 31.

According to this embodiment, the fixing ribs 34 have T-shapes in plan view as shown in FIGS. 6 and 10. As shown in FIGS. 5 and 9, the fixing ribs 34 are formed integrally with the back surface of the front cabinet 3. The fixing ribs 34 are so formed as to protrude in a direction (direction Y) perpendicular to the back surface of the front cabinet 3. As shown in FIG. 10, the fixing ribs 34 are so formed that the lengths L3 of surfaces 34a in contact with the speakers 6 are longer than the lengths L4 of the surfaces 34b not in contact with the speakers 6. In other words, the fixing ribs 34 are so formed as to extend in a direction substantially horizontal to the longitudinal direction (direction X) of the speaker mounting portions 31. These fixing ribs 34 have functions of bringing the speakers 6 into close contact with the speaker mounting portions 31 in mounting the speakers 6 on the speaker mounting portions 31.

A plurality of the antislip ribs 33 and a plurality of the fixing ribs 34 are alternately arranged in a direction along the longitudinal direction (direction X) of the speaker mounting portions 31.

Figure 7:
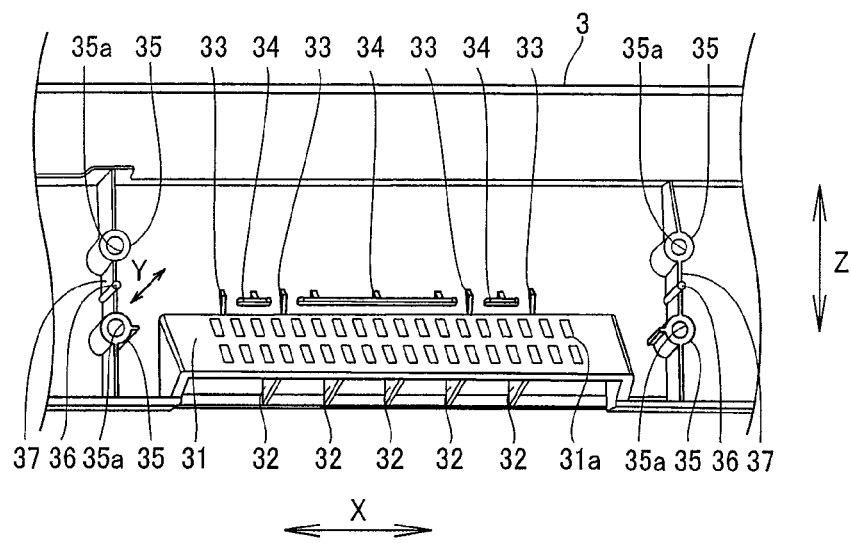
FIG. 7 is a perspective view of the speaker mounting portion according to the embodiment of the present invention.

As shown in FIGS. 6 and 7, the screw mounting boss portions 35 are formed integrally with the back surface of the front cabinet 3. The screw mounting boss portions 35 are so formed as to protrude in a direction (direction Y) perpendicular to the back surface of the front cabinet 3. The screw mounting boss portions 35 have cylindrical shapes as viewed from the direction Y and have screw mounting holes 35a.

According to this embodiment, the positioning boss portions 36 are formed integrally with the back surface of the front cabinet 3 as shown in FIGS. 6 and 7. The positioning boss portions 36 are so formed as to protrude to the direction (direction Y) perpendicular to the back surface of the front cabinet 3. The positioning boss portions 36 have columnar shapes as viewed from the direction Y. Each of the positioning boss portions 36 is so arranged as to be held by the screw mounting boss portions 35 at prescribed intervals. Connecting ribs 37 are so provided as to connect the screw mounting boss portions 35 and the positioning boss portions 36.

Figure 12:
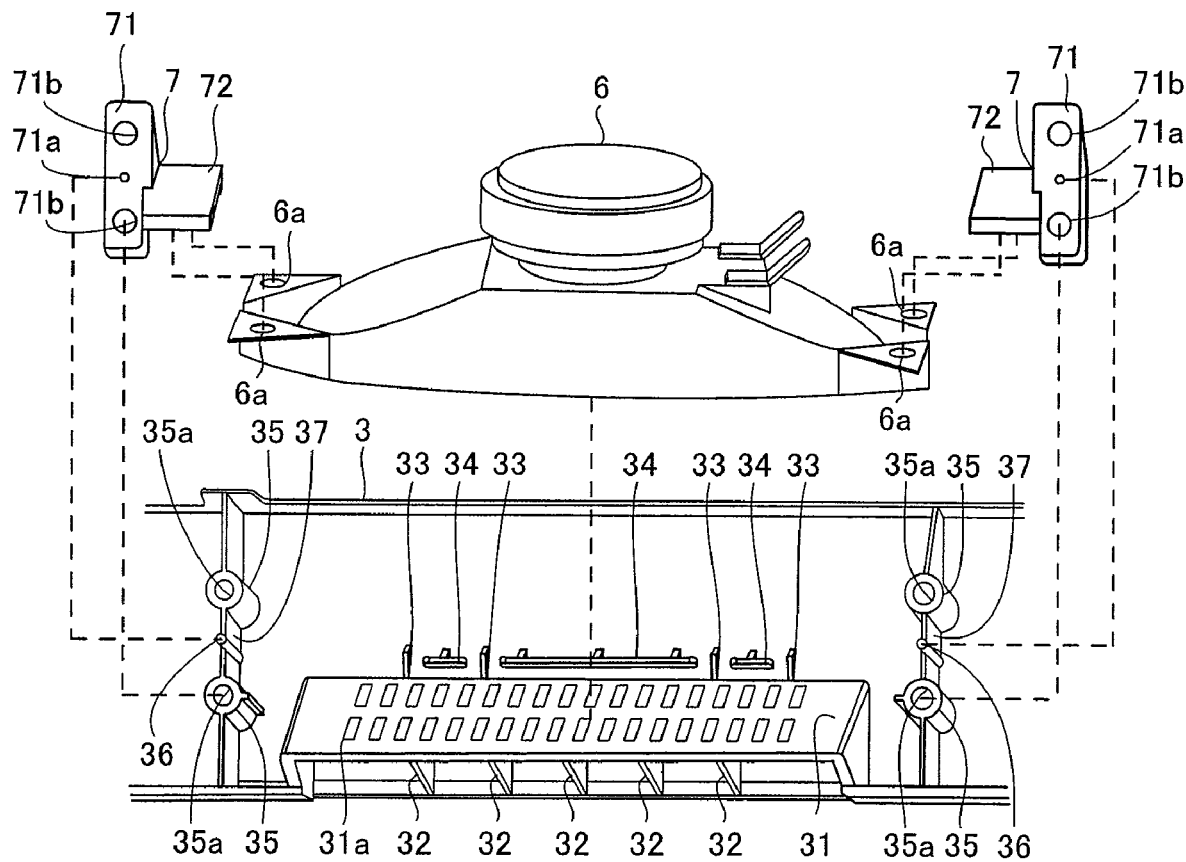
FIG. 12 is a perspective view showing a state of mounting the holders, the speaker and the speaker mounting portion according to the embodiment of the present invention.

According to this embodiment, each of the speakers 6 includes four positioning holes 6a as shown in FIG. 12. The four positioning holes 6a are examples of the "second positioning holes" in the present invention. The four positioning holes 6a have circular shapes. As shown in FIG. 5, corners 61 of end sides of the speakers 6 are so formed as to dent the surfaces of the fixing ribs 34 in a state where the speakers 6 are mounted on the speaker mounting portions 31.

Figure 13:
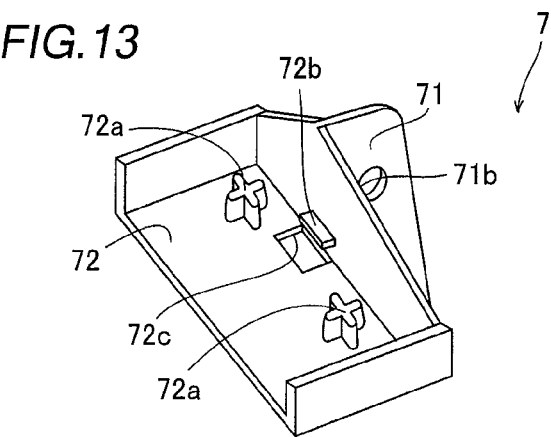
FIG. 13 is a perspective view of the holder according to the embodiment of the present invention.
Figure 14:
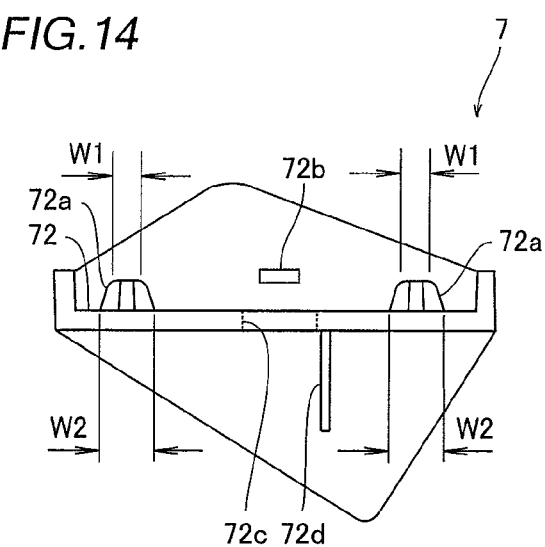
FIG. 14 is a side elevational view of the holder according to the embodiment of the present invention.

According to this embodiment, each of the holders 7 comprises a front cabinet mounting portion 71 and a speaker holding portion 72, as shown in FIGS. 11 to 15. Each of the front cabinet mounting portions 71 includes one positioning hole 71a and two screw receiving holes 71b arranged so as to hold the one positioning hole 71a. Each of the speaker holding portions 72 includes two positioning boss portions 72a, one speaker engaging portion 72b and one opening 72c. As shown in FIG. 14, reinforcing ribs 72d are provided on back surfaces of the speaker holding portions 72. The front cabinet mounting portion 71 is an example of the "front housing mounting portion" in the present invention. The one positioning hole 71a is an example of the first positioning hole in the present invention, and the two positioning boss portions 72a are examples of the "second positioning boss portions" in the present invention.

According to this embodiment, the one positioning hole 71a has a circular shape, as shown in FIGS. 11 to 15. The one positioning hole 71a receives the positioning boss portion 36 provided on the front cabinet 3, so that each holder 7 holding the speaker 6 is positioned at a prescribed position with respect to the front cabinet 3. As shown in FIG. 3, the front cabinet mounting portions 71 are formed parallel to the front cabinet 3 in a state of holding the speakers 6.

The two screw receiving holes 71b have circular shapes. The two screw receiving holes 71b are so formed as to receive screws 8. The screws 8 are screwed into the screw mounting holes 35a of the screw mounting boss portions 35 provided on the front cabinet 3 through the two screw receiving holes 71b, so that the screws are formed on inner surfaces of the screw mounting holes 35a to be fixed.

According to this embodiment, each of the two positioning boss portions 72a has a cruciform shape in plan view as shown in FIGS. 11 to 15. The two positioning boss portions 72a are so formed as to protrude in a direction perpendicular to a surface of the speaker holding portion 72. As shown in FIG. 14, the two positioning boss portions 72a have so-called tapered shapes so that the widths W1 (diameters of circumscribed circles of cruciform portions) of forward ends of the two positioning boss portions 72a are smaller than the widths W2 (diameters of the circumscribed circles of the cruciform portions) of root portions. The two positioning boss portions 72a are inserted into the positioning holes 6a provided on the speaker 6, so that the speaker 6 is held by the speaker holding portion 72 and the holder 7 is positioned with respect to the speaker 6. The speaker holding portions 72 are formed parallel to the speaker mounting portions 31 in the state of holding the speakers 6. The diameters (widths W2) of the root portions of the positioning boss portions 72a are slightly larger than the diameters of the positioning holes 6a of the speakers 6.

Figure 11:
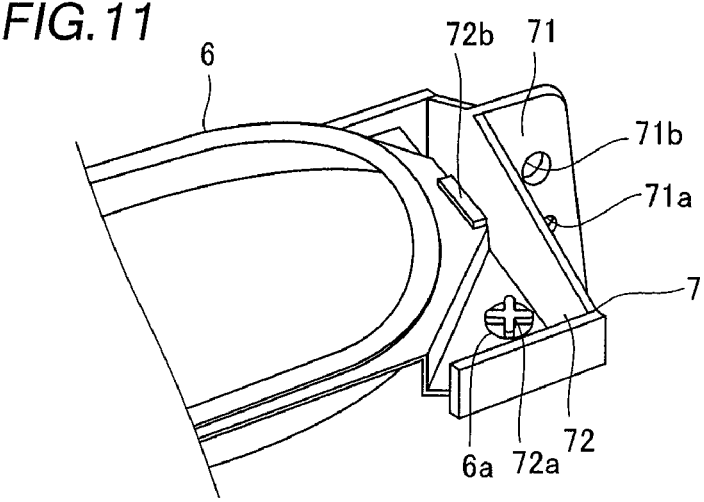
FIG. 11 is a perspective view of the speaker according to the embodiment of the present invention in a state held by a holder.
Figure 15:
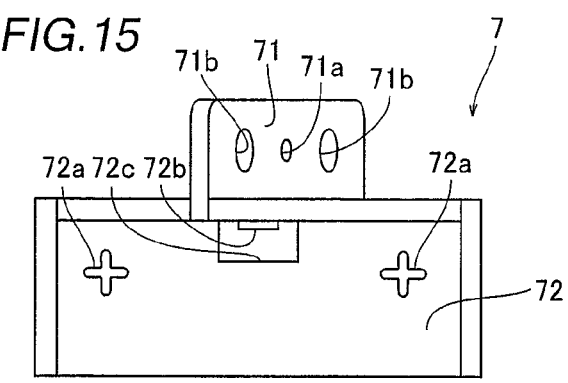
FIG. 15 is a plan view of the holder according to the embodiment of the present invention.

The one speaker engaging portion 72b is so formed as to engage with the one end side of the speaker 6 as shown in FIG. 11. The speakers 6 are mounted on the speaker mounting portions 31 in the state of engaging with the speaker engaging portions 72b of the holders 7. As shown in FIGS. 13 and 15, the one speaker engaging portion 72b is formed in a rectangular shape in plan view. The one speaker engaging portion 72b is so formed as to extend in a longitudinal direction of the speaker holding portion 72.

As shown in FIGS. 13 and 15, the one opening 72c is formed on the surface of the speaker holding portion 72, as shown in FIGS. 13 and 15. The one opening 72c is formed in a rectangular shape in plan view as shown in FIG. 15. The one opening 72c is so formed as to extend in the longitudinal direction of the speaker holding portions 72. In each reinforcing rib 72d, one side of the reinforcing rib 72d is formed on the back surface of the speaker holding portion 72, the other side of the reinforcing rib 72d is formed on a back surface of the front cabinet mounting portion 71.

The procedure of mounting the speakers 6 on the speaker mounting portions 31 of the liquid crystal display 1 according to the embodiment of the present invention will be now described with reference to FIGS. 3, 12, and 16 to 19.

Figure 16:
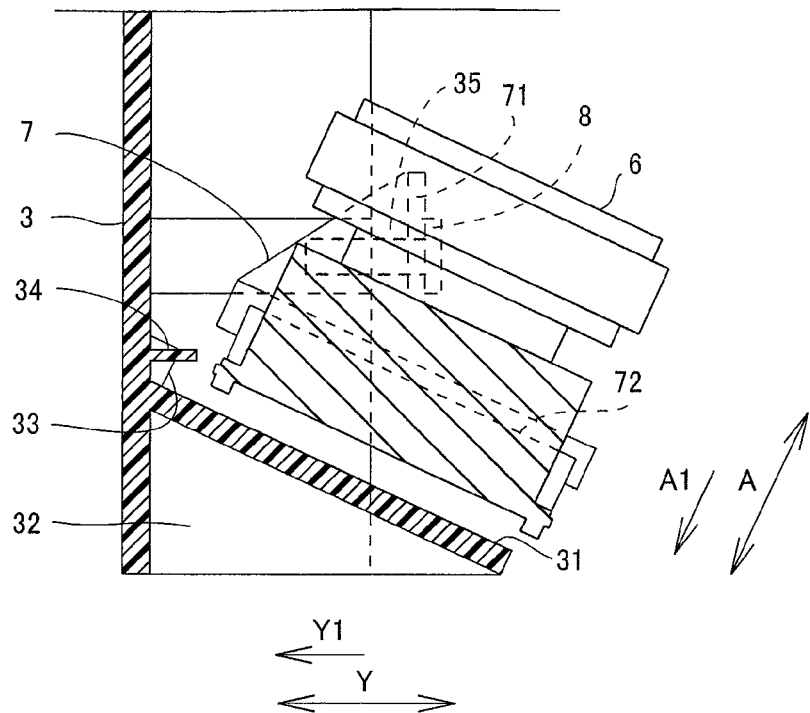
FIGS. 16 to 19 are sectional views for illustrating the procedure for mounting the speaker to the speaker mounting portion according to the embodiment of the present invention.
Figure 17:
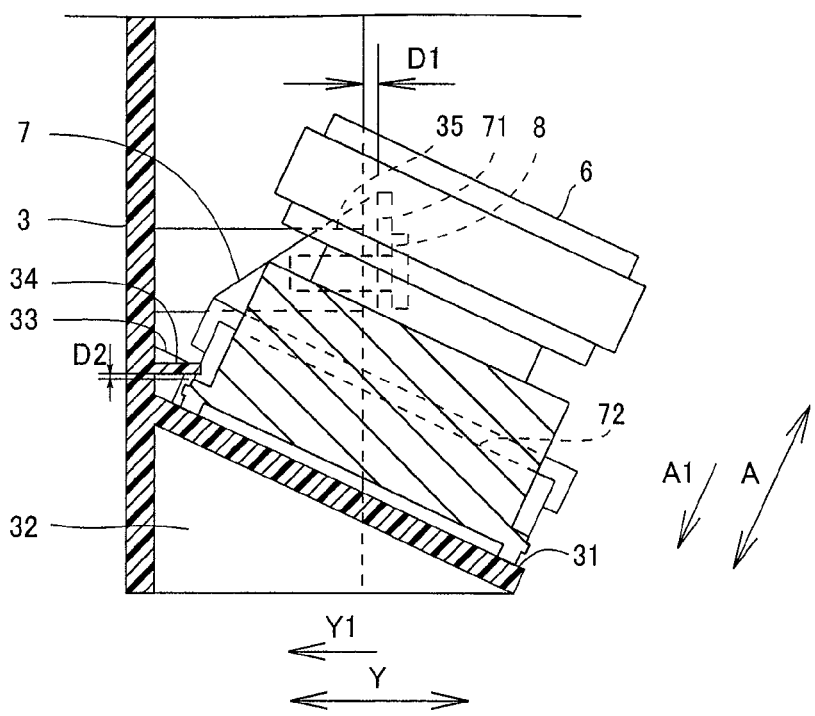

As shown in FIGS. 3, 12 and 16, the positioning holes 71a of the holders 7 receives the positioning boss portions 36 of the front cabinet 3 in a state where the speaker holding portions 72 of the holders 7 hold the speakers 6. As shown in FIGS. 3 and 12, the speakers 6 are so arranged as to be in contact with the surfaces of the speaker mounting portions 31 in a state where the positioning holes 71a of the holders 7 receive the positioning boss portions 36 of the front cabinet 3. At this time, the end sides of the speakers 6 are not in contact with the antislip ribs 33 and the fixing ribs 34 as shown in FIG. 17. Each of the intervals D1 between the surfaces of the screw mounting boss portions 35 of the front cabinet 3 and the front cabinet mounting portions 71 of the holders 7 is about 1.0 mm. Each of the intervals D2 between the fixing ribs 34 and the speakers 6 is about 0.7 mm.

Figure 18:
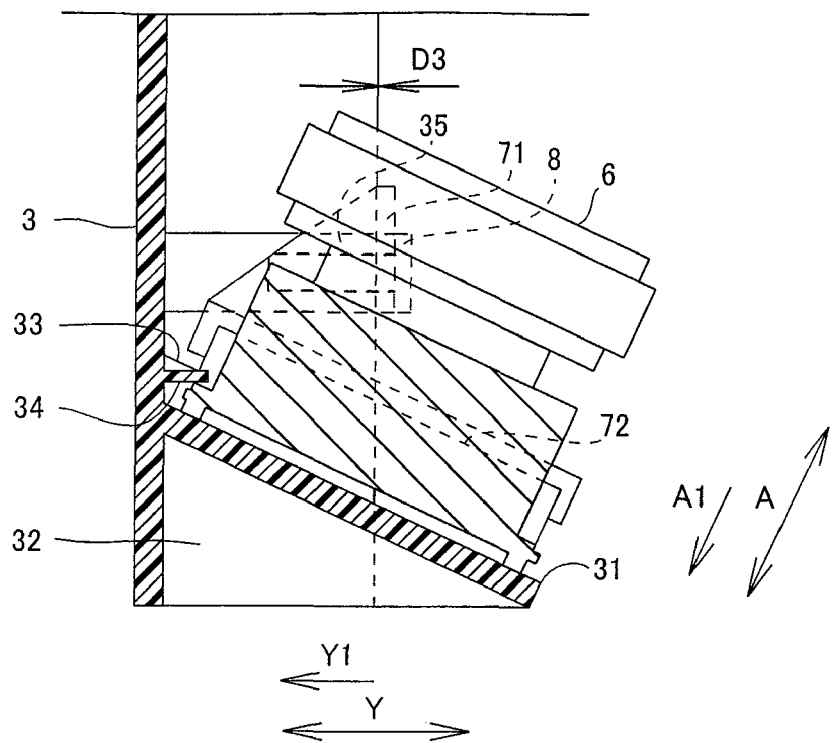
Figure 19:
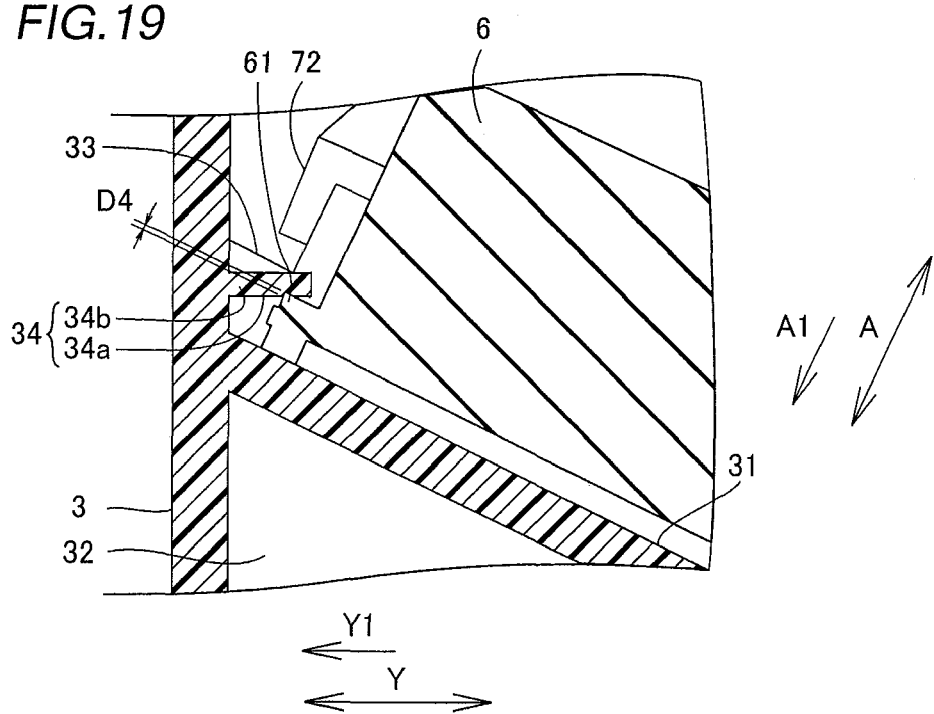

As shown in FIG. 18, speakers 6 held by the speaker holding portions 72 of the holders 7 move along arrow Y so as to slide on the surfaces of the speaker mounting portions 31 by clamping the screws 8 along arrow Y. Then the screws 8 are clamped to the screw mounting holes 35a until the intervals D3 between the surfaces of the screw mounting boss portions 35 of the front cabinet 3 and the holders 7 reach 0 mm. At this time, the end sides of the speakers 6 dent the surfaces 34a of the fixing ribs 34 in contact with the speakers 6. Each of the dent amount D4 is about 0.1 mm. The holders 7 have surfaces parallel to the front cabinet 3 and surfaces parallel to the speaker mounting portions 31, and hence the clamping force in clamping each screw 8 to the screw mounting hole 35a is divided into the force in a direction (along arrow Y1) toward the back surface of the front cabinet 3 and the force in a direction (along arrow A1) toward the speaker mounting portion 31. Each of the speakers 6 comes into close contact in a direction (along arrow A1) perpendicular to the surface of the speaker mounting portion 31 by the clamping force to the direction (along arrow A1) toward the speaker mounting portion 31.

According to this embodiment, as hereinabove described, the speaker mounting portions 31 are provided in the vicinity of the lower end of the back surface of the front cabinet 3, whereby the speakers 6 are mounted in the vicinity of the lower end of the back surface of the front cabinet 3 and hence the length of the front cabinet 3 in a horizontal direction can be reduced. The speakers 6 are mounted in the state of being inclined by a prescribed angle with respect to the front surface of the front cabinet 3, whereby a sound can output downward and forward and hence a sound output from the front side can be inhibited from being difficult to be heard.

According to this embodiment, as hereinabove described, the liquid crystal display 1 further comprises the antislip ribs 33 for regulating movement of the speakers 6 in a direction along the surfaces of the speaker mounting portions 31 when mounting the speakers 6 on the speaker mounting portions 31, formed integrally with the front cabinet 3, whereby the speakers 6 can be mounted in the state where the antislip ribs 33 inhibit the speakers 6 from moving in the direction along the surfaces of the speaker mounting portions 31.

According to this embodiment, as hereinabove described, the surfaces of the antislip ribs 33 in contact with the end sides of the speakers 6 are formed perpendicular to the surfaces of the speaker mounting portions 31, whereby the speakers 6 can be mounted at prescribed positions of the speaker mounting portions 31 only by bringing the end sides of the speakers 6 into contact with the antislip ribs 33.

According to this embodiment, as hereinabove described, the antislip ribs 33 extending in the direction (direction Z) orthogonal to the longitudinal direction (direction X) of the speaker mounting portions 31 are employed as the first movement regulating portions, whereby the speakers 6 can be mounted in the state where the antislip ribs 33 inhibit the speakers 6 from slipping in the direction (direction Z) substantially orthogonal to the longitudinal direction (direction X) of the speaker mounting portions 31.

According to this embodiment, as hereinabove described, the liquid crystal display 1 further comprises the fixing ribs 34 for bringing the speakers 6 into close contact with the speaker mounting portions 31 while regulating movement of the speakers 6 in the direction perpendicular to the surfaces of the speaker mounting portions 31 when mounting the speakers 6 on the speaker mounting portions 31, formed integrally with the front cabinet 3, whereby the speakers 6 can be mounted in the state where the fixing ribs 34 inhibit the speakers 6 from moving in the direction perpendicular to the surfaces of the speaker mounting portions 31. Thus, the speakers 6 can come into close contact with and mounted on the speaker mounting portions 31 and hence the sound output from the speakers 6 can be output forward of the front cabinet 3. Consequently, sounds can be inhibited from staying in the housing.

According to this embodiment, as hereinabove described, the corners 61 of the end sides of the speakers 6 dent the fixing ribs 34 in the state where the speakers 6 are mounted on the speaker mounting portions 31, whereby the speakers 6 can be inhibited from deviating with respect to the fixing ribs 34.

According to this embodiment, as hereinabove described, the fixing ribs 34 formed so as to extend in the direction (direction X) substantially parallel to the longitudinal direction (direction X) of the speaker mounting portions 31 are employed as the second movement regulating portions, whereby the speakers 6 can be fixed in the state where the fixing ribs 34 inhibit the speakers 6 from moving in the direction (direction Z) perpendicular to the surfaces of the speaker mounting portions 31.

According to this embodiment, as hereinabove described, the speaker mounting portions 31 are formed in a plate-like shape in the vicinity of the lower end of the back surface of the front cabinet 3 in the state of being inclined by 25 degrees with respect to the front surface of the front cabinet 3, and the triangular reinforcing ribs 32 are provided between the plate-like speaker mounting portions 31 and the back surface of the front cabinet 3, whereby the speaker mounting portions 31 can be reinforced by the reinforcing ribs 32 in the state of being inclined by 25 degrees with respect to the front surface of the front cabinet 3 and hence the strength of the speaker mounting portions 31 can be improved.

According to this embodiment, as hereinabove described, the liquid crystal display 1 further comprises the antislip ribs 33 for regulating movement of the speakers 6 in the direction along the surfaces of the speaker mounting portions 31 when mounting the speakers 6 on the speaker mounting portions 31, formed integrally with the front cabinet 3, the fixing ribs 34 for bringing the speakers 6 into close contact with the speaker mounting portions 31 while regulating movement of the speakers 6 in the direction perpendicular to the surfaces of the speaker mounting portions 31 when mounting the speakers 6 on the speaker mounting portions 31, formed integrally with the front cabinet 3 and the holders 7 for mounting the speakers 6 on the speaker mounting portions 31, holding the speakers 6, and the speakers 6 held by the holders 7 are so formed as to be fixed in the state where the end sides of the speakers 6 are in contact with the antislip ribs 33 and the fixing ribs 34 when mounting the speakers 6 on the speaker mounting portions 31, whereby the antislip ribs 33 and the fixing ribs 34 regulate the movement of the speakers 6 with respect to the surfaces of the speaker mounting portions 31 and the speakers 6 can be firmly mounted on the speaker mounting portions 31 by the holders 7.

According to this embodiment, as hereinabove described, the plurality of antislip ribs 33 and the plurality of the fixing ribs 34 are alternately arranged in the direction along the longitudinal direction of the speaker mounting portions 31, whereby the antislip ribs 33 and the fixing ribs 34 can further regulate the movement of the speakers with respect to the speaker mounting portions 31.

According to this embodiment, as hereinabove described, the holders 7 have the speaker holding portions 72 formed parallel to the speaker mounting portions 31 in the state of holding the speakers 6 and the front cabinet mounting portions 71 formed parallel to the front cabinet 3 in the state of holding the speakers 6, whereby the speaker holding portions 72 of the holders 7 are formed parallel to the speaker mounting portions 31 mounting the speakers 6 in the state of being inclined by the prescribed angle with respect to the front surface of the front cabinet 3, and hence the speakers 6 can be easily mounted on the speaker mounting portions 31 by the speaker holding portions 72 of the holders 7 in the state of being inclined by the prescribed angle with respect to the front cabinet 3 when mounting the holders 7 on the front cabinet 3.

According to this embodiment, as hereinabove described, the speakers 6 are mounted on the speaker mounting portions 31 in the state of engaging with the speaker engaging portion 72b of the holders 7, whereby the speakers 6 can be firmly fixed to the speaker mounting portions 31.

According to this embodiment, as hereinabove described, either one of the front cabinet mounting portions 71 of the holders 7 or the front cabinet 3 include the positioning bosses, either the other of the front cabinet mounting portions 71 of the holders 7 or the front cabinet 3 include the positioning holes, and the positioning bosses are inserted into the positioning holes, so that the holders 7 holding the speakers 6 are positioned at the prescribed positions with respect to the front cabinet 3, whereby the holders 7 can be easily positioned at the prescribed positions with respect to the front cabinet 3 by arranging the front cabinet mounting portions 71 of the holders 7 so as to inserting the positioning bosses into the positioning holes.

According to this embodiment, as hereinabove described, either one of the speaker holding portions 72 of the holders 7 or the speakers 6 include the positioning bosses, either the other of the speaker holding portions 72 of the holders 7 or the speakers 6 include the positioning holes, and the positioning bosses are inserted into the positioning holes, so that the speakers 6 are held by the speaker holding portions 72 of the holders 7 and the holders 7 are positioned with respect to the speakers 6, whereby the speaker holding portions 72 of the holders 7 can be easily positioned at the prescribed positions with respect to the speakers 6 by arranging the speaker holding portions 72 of the holders 7 so as to insert the positioning bosses into the positioning holes.

According to this embodiment, as hereinabove described, the positioning boss portions 72*a* have the tapered shapes, whereby the positioning boss portions 72*a* can be easily inserted into the positioning holes 6*a*.

According to this embodiment, as hereinabove described, the positioning boss portions 72*a* have the cruciform shapes in plan view, whereby the positioning boss portions 72*a* can be easily inserted into the positioning holes 6*a*.

According to this embodiment, as hereinabove described, the surfaces of the speaker mounting portions 31 where the speakers 6 are mounted include the acoustical holes 31 for outputting the sounds from the speakers 6, whereby the sounds output from the speakers 6 can be reliably output downward and forward from the acoustical holes 31.

Although the present invention has been described and illustrated in detail, it is clearly understood that the same is by way of illustration and example only and is not to be taken by way of limitation, the spirit and scope of the present invention being limited only by the terms of the appended claims.

For example, the aforementioned embodiment is applied to the liquid crystal display employed as the exemplary display, the present invention is not restricted to this but may alternatively be applied to a display other than the liquid crystal display.

While the positioning bosses are provided on the front cabinet and the positioning holes are provided on the holders in the aforementioned embodiment, the present invention is not restricted to this but the positioning holes may be provided on the front cabinet and the positioning bosses may be provided on the holders.

While the positioning bosses are provided on the holders and the positioning holes are provide on the speakers in the aforementioned embodiment, the present invention is not restricted to this but the positioning holes may be provided on the holders and the positioning bosses may be provide on the speakers.

What is claimed is:

1. A display comprising:
   a frame-shaped front housing for fixing a display portion so as to expose said display portion;
   a speaker;
   a speaker mounting portion for mounting to be capable of outputting a sound downward and forward in a state where said speaker is inclined by a prescribed angle with respect to a front surface of said front housing, integrally formed in the vicinity of a lower end of a back surface of said front housing; and
   a first movement regulating portion for regulating movement of said speaker in a direction along a surface of said speaker mounting portion when mounting said speaker on said speaker mounting portion, formed integrally with said front housing.

2. The display according to claim 1, wherein
   a surface in contact with an end side of said speaker of said first movement regulating portion is formed substantially perpendicular to said surface of said speaker mounting portion.

3. The display according to claim 1, wherein
   said first movement regulating portion includes an antislip rib extending in a direction substantially orthogonal to a longitudinal direction of said speaker mounting portion.

4. The display according to claim 1, wherein
   a surface of said speaker mounting portion on which said speaker is mounted includes an acoustical hole for outputting a sound from said speaker.

5. A display comprising:
   a frame-shaped front housing for fixing a display portion so as to expose said display portion;
   a speaker;
   a speaker mounting portion for mounting to be capable of outputting a sound downward and forward in a state where said speaker is inclined by a prescribed angle with respect to a front surface of said front housing, integrally formed in the vicinity of a lower end of a back surface of said front housing; and
   a second movement regulating portion for bringing said speaker into close contact with said speaker mounting portion while regulating movement of said speaker in a direction perpendicular to a surface of said speaker mounting portion when mounting said speaker on said speaker mounting portion, formed integrally with said front housing.

6. The display according to claim 5, wherein
   a corner of an end side of said speaker is so formed as to dent said second movement regulating portion in a state where said speaker is mounted on said speaker mounting portion.

7. The display according to claim 5, wherein
   said second movement regulating portion includes a fixing rib formed so as to extend in a direction substantially parallel to a longitudinal direction of said speaker mounting portion.

8. A display comprising:
   a frame-shaped front housing for fixing a display portion so as to expose said display portion;
   a speaker; and
   a speaker mounting portion for mounting to be capable of outputting a sound downward and forward in a state where said speaker is inclined by a prescribed angle with respect to a front surface of said front housing, integrally formed in the vicinity of a lower end of a back surface of said front housing, wherein
   said speaker mounting portion is formed in a plate-like shape in the vicinity of said lower end of said back surface of said front housing in a state of being inclined by a prescribed angle with respect to said front surface of said front housing, and
   a triangular reinforcing rib is provided between said plate-like speaker mounting portion and said back surface of said front housing.

9. A display comprising:
   a frame-shaped front housing for fixing a display portion so as to expose said display portion;
   a speaker;
   a speaker mounting portion for mounting to be capable of outputting a sound downward and forward in a state where said speaker is inclined by a prescribed angle with respect to a front surface of said front housing, integrally formed in the vicinity of a lower end of a back surface of said front housing;
   a first movement regulating portion for regulating movement of said speaker in a direction along a surface of said speaker mounting portion when mounting said speaker on said speaker mounting portion, formed integrally with said front housing;
   a second movement regulating portion for bringing said speaker into close contact with said speaker mounting portion while regulating movement of said speaker in a direction perpendicular to said surface of said speaker mounting portion when mounting said speaker on said speaker mounting portion, formed integrally with said front housing;

a holding member for holding said speaker and mounting said speaker on said speaker mounting portion, wherein said speaker held by said holding member is so formed as to be fixed in a state where an end side of said speaker is in contact with said first movement regulating a portion and said second movement regulating a portion when mounting said speaker on said speaker mounting portion.

10. The display according to claim 9, wherein a plurality of said first movement regulating portions and a plurality of said second movement regulating portions are provided, and are alternately arranged in a direction along a longitudinal direction of said speaker mounting portion.

11. The display according to claim 9, wherein said holding member has a speaker holding portion formed substantially parallel to said speaker mounting portion in a state of holding said speaker and a front housing mounting portion formed substantially parallel to said front housing in the state of holding said speaker.

12. The display according to claim 9, wherein said speaker holding portion of said holding member includes an engaging portion engaging with said end side of said speaker, and said speaker is mounted on said speaker mounting portion in a state of engaging with said engaging portion of said holding member.

13. The display according to claim 9, wherein either one of said front housing mounting portion of said holding member or said front housing includes a first positioning boss portion, either the other of said front housing mounting portion of said holding member or said front housing includes a first positioning hole, and said holding member holding said speaker is so formed as to be positioned at a prescribed position with respect to said front housing by inserting said first positioning boss portion into said first positioning hole.

14. The display according to claim 9, wherein either one of said speaker holding portion of said holding member or said speaker includes a second positioning boss portion, either the other of said speaker holding portion of said holding member or said speaker includes a second positioning hole, and said speaker is held by said speaker holding portion of said holding member by inserting said second positioning boss portion into said second positioning hole, and said holding member is so formed as to be positioned with respect to said speaker.

15. The display according to claim 14, wherein said second positioning boss portion has a tapered shape.

16. The display according to claim 14, wherein said second positioning boss portion has a cruciform shape in plan view.

\* \* \* \* \*